J. F. CONNOLLY.
SMOKELESS BROILER.
APPLICATION FILED OCT. 25, 1911.

1,069,390.

Patented Aug. 5, 1913.

Witnesses:
John C. Kopf
M. Herskovitz

Inventor:
James F. Connolly
By his Attorney
Chas. M. C. Chapman

UNITED STATES PATENT OFFICE.

JAMES F. CONNOLLY, OF NEW YORK, N. Y.

SMOKELESS BROILER.

1,069,390.  Specification of Letters Patent.  Patented Aug. 5, 1913.

Application filed October 25, 1911. Serial No. 656,702.

*To all whom it may concern:*

Be it known that I, JAMES F. CONNOLLY, a citizen of the United States, residing in the borough of Manhattan, city, county, and State of New York, have invented a new and useful Improvement in Smokeless Broilers, of which the following is a description.

This invention relates to cooking utensils and particularly to broilers for meat, fish, etc.

Among the objects of my invention may be noted the following: to provide a broiler which will be smokeless, that is, one with which meat may be broiled without emitting odor, smoke, or fumes of cooking; to provide a broiler which will cook very rapidly and more thoroughly and will "brown" satisfactorily; and to provide a covered broiler, the cover of which will not only retain the fumes and hence flavor the food being cooked, but will render the holder smokeless and will, after the food is thoroughly cooked, operate or be useful as a dripping-pan for gravy-making purposes.

Figure 1:
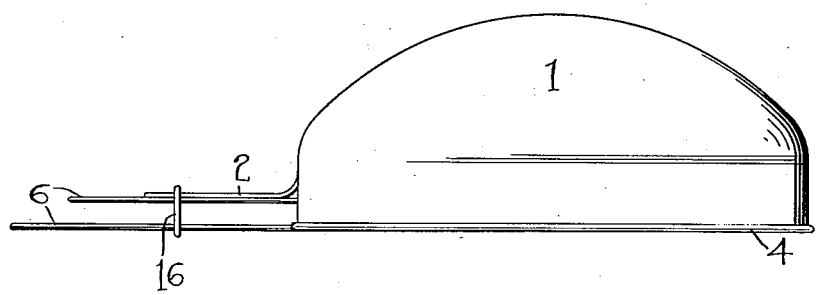
Figure 2:
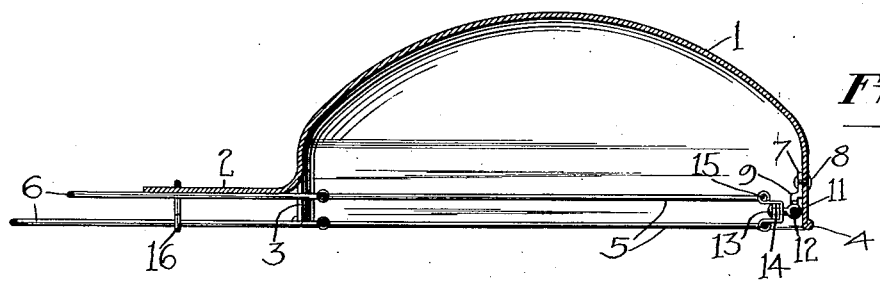
Figure 3:
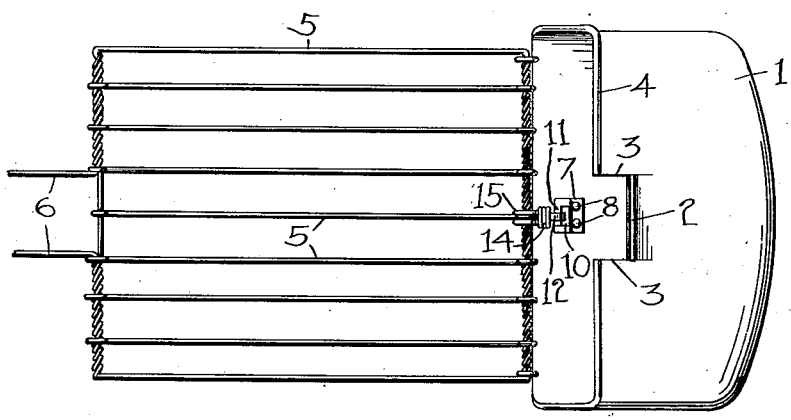
Figure 4:
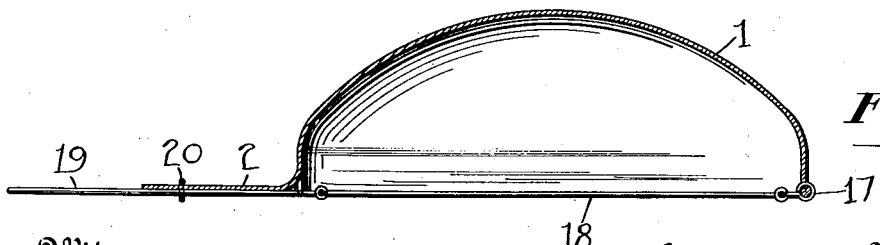

In order that my invention may be thoroughly understood, I have provided drawings wherein:

Figure 1 is a side elevation of a structure embodying my invention; Fig. 2 is a longitudinal central section; Fig. 3 is a top plan showing the cover of the broiler thrown back; and Fig. 4 is a longitudinal central section of a form of my invention adapted for broiling, baking, toasting, etc.

Referring to the drawings, the numeral 1 indicates the hood or cover of my device, which is provided with a handle-extension 2, at its forward end, said handle being formed by cutting the material of the cover along the lines 3 and turning up the portion constituting the said handle. The bottom of the cover is curled or beaded around its edge, as at 4, for strength and appearance.

The broiler, in the form shown in Figs. 1, 2 and 3, is composed of the two barred sections 5, made as usual, each of which is provided with a handle indicated by 6, one of the handles being longer than the other. This double broiler section is made of bent wire so formed as to provide the handles, the longitudinal bars and the rear end joining portions, enabling one part to hinge upon the other. The cover 1 is secured to the broiler portion by means of a double swivel or hinge joint formed by providing the cover with a bracket 7, riveted at 8 to the center of the cover near its lower edge at its rear end, as clearly shown in Figs. 2 and 3. The bracket is offset at 9, so as to make the lower portion thereof clear the body of the cover, and said lower portion is provided with an elongated slot 10, and below the same with a bar 11, to which is secured the loop 12, of a headed pin 13. The body of said pin 13 extends through the coils 14 of the socket-member 15 of the swivel connection; that is to say, the said socket-member 15 with its coils 14, coupled with the headed pin 13, as shown in Figs. 2 and 3, form a swivel connection between the cover and the broiler and the loop 12 of said pin, coupled with the bar 11 of the bracket 7, form a hinge or pivotal connection between the cover and the broiler. This double connection, for the sake of brevity in the claims, will be referred to as a "double joint" or "double hinge," or "double swivel" connection. By thus joining the cover and broiler together, the cover may be swung upon the broiler because of the connection 11—12, or the broiler may be swung upon the cover when the device is inverted, and the broiler may be reversed or turned over upon the connection 13—15, as will be clear upon inspecting Fig. 2. When the parts are in position for operation, they are held by means of the loop 16, which encircles the handles 6 of the broiler and handle 2 of the cover, the latter handle resting upon the upper one of the broiler handles.

The operation of the form of my invention shown in Figs. 1, 2 and 3 will now be understood from the following: To insert the meat, the loop 16 is slid back upon the longer of the two handles 6 of the broiler, thus enabling the cover and the upper member to be swung back. If, at any time, it is desired to determine the progress being made in the cooking, the loop 16 may be slid back sufficiently far upon the handles 6 as to release the handle 2, thus enabling the cover to be turned back, as shown in Fig. 3. In this position, also, the broiler may be turned relatively to the cover by reason of the swivel-joint connection between the broiler and cover. When the meat has been sufficiently broiled and while the juice is still dripping therefrom, the device, as shown in Fig. 1, may be inverted, thus allowing the juice to drip into the cover. With the device in this position, the meat can be seasoned with condiments and butter, thus producing a palatable gravy, which will drip into the cover; and, to hasten the gravy-making, the device thus inverted can be placed in the oven, which will also keep the meat warm until ready to serve. Thus, a great deal of the juice of the meat usually wasted is saved and the latter is not removed from the broiler until ready to serve.

In the form of my invention shown in Fig. 4, the cover 1, having the handle 2, is hinged at 17 to a single broiler 18, that is, a broiler consisting of a single barred member having the extended handle 19, which may be secured to the handle 2 by the loop 20, to hold the cover and broiler member together. This form of my invention is found to be exceedingly useful for toasting, broiling and baking, and is slightly cheaper than the double broiler construction. In fact, the single broiler construction is equally useful as the double broiler construction.

My invention, as thus constructed, constitutes an outside oven and is smokeless, since the fumes, odors and vapors rising within the cover will quickly find a way below the broiler section into the fire below, where they will be consumed, this being due to the heat and expansion of steam within the cover, which will set up a current having a tendency to escape in the downward direction through and around the bars of the broiler.

This device, owing to its uses and purposes as above set forth, is very useful in light housekeeping, as well as in hotels and cafés, since a great many different things can be cooked thereon and meat and fish can be kept quite hot and juicy for a long period.

Having thus described my invention, what I claim and desire to secure by Letters Patent is:

1. A cooking utensil comprising a barred member and a domed cover member, each having a handle, means for holding the handles in coöperative relation, and means for hinging the two members together including a swivel connection.

2. A cooking utensil comprising a double broiler member between the parts of which food may be held, a cover, and a double hinge connection between the cover and broiler member enabling the cover and broiler member to swing relatively in one direction and the broiler member to swing relatively to the cover in another direction at a right angle to the direction of the movement first mentioned.

In testimony whereof I have hereunto signed my name in the presence of two subscribing witnesses.

JAMES F. CONNOLLY.

Witnesses:
CHAS. McC. CHAPMAN,
M. HERSKOVITZ.